United States Patent
Hirayama

(10) Patent No.: US 7,248,550 B2
(45) Date of Patent: Jul. 24, 2007

(54) WRITING METHOD AND DISK RECORDING APPARATUS

(75) Inventor: Hiroshi Hirayama, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 612 days.

(21) Appl. No.: 10/626,010

(22) Filed: Jul. 23, 2003

(65) Prior Publication Data

US 2004/0125726 A1    Jul. 1, 2004

(30) Foreign Application Priority Data

Dec. 26, 2002   (JP)   ............................. 2002-375848

(51) Int. Cl.
*G11B 7/007* (2006.01)
(52) U.S. Cl. ................................. 369/47.3
(58) Field of Classification Search ............. 369/47.3
See application file for complete search history.

(56) References Cited

U.S. PATENT DOCUMENTS

| | | | |
|---|---|---|---|
| 6,538,982 B1 * | 3/2003 | Van Vlerken et al. | 369/275.4 |
| 6,674,330 B2 * | 1/2004 | Bokui et al. | 331/11 |
| 6,687,204 B2 * | 2/2004 | Miyanabe et al. | 369/47.17 |
| 6,947,364 B1 * | 9/2005 | Hogan et al. | 369/53.45 |
| 2002/0099986 A1 | 7/2002 | Eam | |

FOREIGN PATENT DOCUMENTS

| | | |
|---|---|---|
| JP | 11-045514 | 2/1999 |
| JP | 2002-050109 | 2/2002 |

* cited by examiner

*Primary Examiner*—Gautam R. Patel
(74) *Attorney, Agent, or Firm*—Townsend and Townsend and Crew LLP

(57) ABSTRACT

Disclosed are a writing method and a disk recording apparatus for maintaining reproduction reliability relative to a rewritable disk recording medium of a zero link type. In one embodiment, a disk recording apparatus for a rewritable optical disk comprises a first timing detector having a first timing synchronized with a wobble reproduction signal of the rewritable optical disk, and a second timing detector having a second timing synchronized with a track reproduction signal of the rewritable optical disk. A phase difference detector is configured to detect a phase difference between the first timing and the second timing. A controller is configured to determine a recording area based on the detected phase difference. In another embodiment, a selector is configured to select a timing between the first timing and the second timing. A controller is configured to control the selector to select the timing based on the detected phase difference, and to record data on a recording track in accordance with the selected timing.

12 Claims, 5 Drawing Sheets

WRITING METHOD AND DISK RECORDING APPARATUS

CROSS-REFERENCES TO RELATED APPLICATIONS

This application relates to and claims priority from Japanese Patent Application Number 2002-375848, filed on Dec. 26, 2002, the entire disclosure of which is incorporated herein by reference.

BACKGROUND OF THE INVENTION

1. Field of the Invention

The present invention relates to a writing method and a disk recording apparatus, and relates in particular to a writing method employed when a rewritable disk recording medium is used for a computer and to a disk recording apparatus that uses the writing method.

2. Description of the Related Art

A DVD-RAM, a DVD-RW, a DVD+RW and a CD-RW are well known rewritable optical disk recording media. But for one of these media to be employed in a computer as though it were a hard disk drive, the reproduction reliability of recorded information must be fully ensured.

A process for linking recording tracks on which information is recorded is employed for the additional writing or rewriting of information. When, for example, a CD-RW is used, to prevent data destruction during the writing or rewriting of additional data, dummy data corresponding in size to a sector is added before and after the linked tracks. That is, redundant data are added before and after the linked tracks to prevent data destruction when the overwriting of data is performed. On the contrary, for a DVD-RW and a DVD+RW, a zero link method is employed whereby the amount of redundant data required for linking is reduced as much as possible, and a reduction in the memory capacity of a disk is avoided (see JP-A-2000-311449, pp. 9 to 10 and FIGS. 4 and 5).

As for the designation of a linking location, phase modulation is performed for wobbled grooves pre-engraved on the track side face of a disk, or sync signal and address information recorded as a land prepit is reproduced, so that even on an unrecorded disk the recording location can be specified.

As is described above, since the dummy data for each sector is added during the additional writing or rewriting performed for the CD-RW, data will not be destroyed even when a slight recording shift occurs. However, since the zero link method is employed for the additional writing performed for the DVD-RW and the DVD+RW, data destruction will occur if there is a slight recording shift. The problems presented by the zero link method will be specifically described while referring to FIGS. 2A, 2B and 2C.

FIG. 2A is a diagram showing the ideal zero linking state. Dummy 8T (T denotes a channel bit that is the basic unit of a recording mark length on a disk) data are added before an ECC block (an error process unit) to be recorded, and the recording of dummy data is begun at the linking location (16th wobble location) at the 8T terminal end of the ECC block, and is halted at the linking location (16th wobble location) at a distance 8T from the terminal end of the ECC block to be recorded. In this manner, the rewriting or additional writing is performed for each ECC block.

The linking location is designated by specifying the wobble location and the head of the ECC block. The head of the ECC block is designated by an ADIP address and a data ID, and the linking location is specified by designating the wobble location through the detection of an ADIP sync phase modulator. The linking location can also be designated by a data ID or the detection of the timing for a frame sync. In the ideal zero linking state, the disabling of the reproduction of an ECC block, caused by a burst error inside an ECC block, does not occur.

FIGS. 2B and 2C are diagrams showing a problem encountered when a frame recorded on a specific track is advanced a distance yT (y is a positive number) from the wobble location on the disk in order to record, on a specific track, data (RMW: read modify write) for a specific ECC block. In the following explanation, the frames are recorded while the wobble position and the frames are shifted a −1 wobble (−32T) distance.

As a factor that depends on the disk recording apparatus, the shifting of a frame relative to the wobble location is affected by a jitter included in a 1T recording clock that is generated in synchronization with the reproduction wobble. For fast recording especially, a cyclic error due to the jitter is accumulated as the frequency of the recording clock is increased.

Further, another factor that depends on the disk recording medium can be the deterioration of the quality of a reproduction wobble signal due to a wobble formation failure, and scratches or dust on the disk.

FIG. 2B is a diagram for explaining a problem that occurs at the RMW front end. When, while using a specified wobble location as a reference, the rewriting of an ECC block is performed for a recording track wherein the frame is shifted a distance yT from the wobble location, the frame sync at the ECC block boundary, which exists as a mark on the track before rewriting is performed, remains, not overwritten.

An explanation will now be given for the detection window operation performed for a frame sync required for the reproduction of a recording track wherein rewriting is performed, and the occurrence of a demodulation error. For a recording track located before a rewriting interval, the frame sync detection is stably performed, and the demodulation unit is designated for the frame data in synchronization with the frame sync detection. Therefore, information recorded before modulation is reproduced.

However, near the boundary of the ECC block for which the rewriting is performed, a detection window is opened by predicting the next frame sync location based on the current frame sync detection location. Therefore, the demodulation of frame data is not performed in synchronization with the frame sync positioned at the head of the rewritten ECC block. That is, since the detection of a frame sync signal is skipped, correct information cannot be obtained following the linking location at the rewritten ECC block boundary, and this phenomenon is transmitted as a burst error inside the ECC block.

Even when a frame sync is undetected, the frame sync detection window is cyclically protected during a period equivalent to the length of several frames. When the times at which the frame sync is undetected are equal to or greater than n (n is a natural number), i.e., when a lock out of the frame sync is detected, the operation is shifted to the pulling-in of a frame sync, and the cyclic protection is resumed beginning with the detection of a first frame sync. The frame data included in an interval beginning at the head of the rewritten ECC block and continuing to the pulling-in of the frame sync is a burst error inside the ECC block, and the reproduction of the ECC block that has been rewritten may be disabled.

FIG. 2C is a diagram for explaining a problem occurring at the RMW rear end. A problem occurs in FIG. 2C that is similar to the one in FIG. 2B, and the frame sync at the ECC block boundary, which was present before the data rewriting, may be lost through overwriting. In this case also, in the ECC block following the linking location, a burst error is transmitted until the pulling-in of the frame sync detection window is performed.

While referring to FIGS. 2A to 2C, the frame has been advanced from the wobble location a distance yT. However, the same problem occurs when the rewriting for each ECC block is performed for a recording track wherein, from the wobble location, the frame is shifted to the rear the distance yT.

Further, since the DVD and the CD are removable recording media, the reproduction compatibility between the disk drives should be maintained, and the occurrence must be prevented from a phenomenon wherein a drive cannot reproduce data recorded on a disk for which rewriting is performed while frames are being shifted.

SUMMARY OF THE INVENTION

It is, therefore, a feature of the present invention to provide a writing method and a disk recording apparatus for resolving these problems that have arisen as a result of ECC block rewriting.

According to one aspect of the invention, a disk recording apparatus for a rewritable optical disk comprises a first timing detector having a first timing synchronized with a wobble reproduction signal of the rewritable optical disk, and a second timing detector having a second timing synchronized with a track reproduction signal of the rewritable optical disk. A phase difference detector is configured to detect a phase difference between the first timing and the second timing. A controller is configured to determine a recording area based on the detected phase difference.

According to another aspect of the invention, a disk recording apparatus for a rewritable optical disk comprises a first timing detector having a first timing synchronized with a wobble reproduction signal of the rewritable optical disk, and a second timing detector having a second timing synchronized with a track reproduction signal of the rewritable optical disk. A phase difference detector is configured to detect a phase difference between the first timing and the second timing. A selector is configured to select a timing between the first timing and the second timing. A controller is configured to control the selector to select the timing based on the detected phase difference, and to record data on a recording track in accordance with the selected timing.

In accordance with another aspect of the invention, a disk recording method for a rewritable optical disk comprises detecting a phase difference between a first timing synchronized with a wobble reproduction signal of the rewritable optical disk and a second timing synchronized with a track reproduction signal of the rewritable optical disk; and determining a recording area for target data to be written based on the detected phase difference.

In accordance with another aspect of the invention, a disk recording method for a rewritable optical disk comprises detecting a phase difference between a first timing synchronized with a wobble reproduction signal of the rewritable optical disk and a second timing synchronized with a track reproduction signal of the rewritable optical disk; selecting a recording timing between the first timing and the second timing based on the detected phase difference; and recording data to the rewritable optical disk in accordance with the selected recording timing.

DETAILED DESCRIPTION OF THE PREFERRED EMBODIMENTS

A disk recording apparatus especially designed for optical disks using a wobble phase modulation system, and a writing method therefor will now be described while referring to the accompanying drawings.

Figure 1:
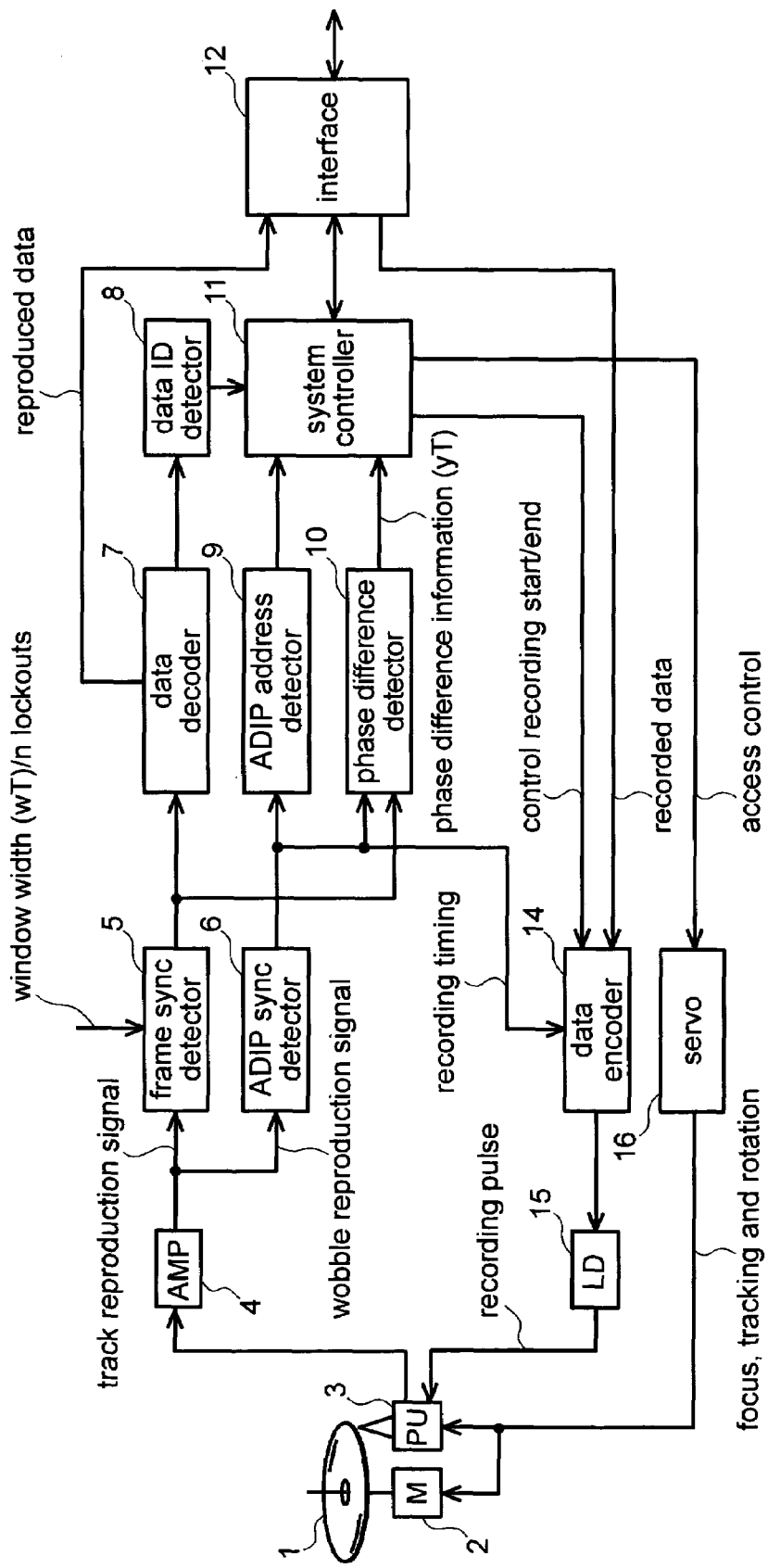
FIG. 1 is a block diagram showing a disk recording apparatus according to a first embodiment of the present invention.

FIG. 1 is a block diagram showing a disk recording apparatus according to a first embodiment of the present invention. In FIG. 1, an optical disk 1 having a wobble phase modulation format is driven by a disk motor 2. A preamplifier 4 generates a difference signal using a photo detector for an optical head 3 that is compatible with disk recording. The preamplifier 4 also reproduces a wobble signal pre-engraved on the track side face on the optical disk 1, or reproduces, as a track reproduction signal, a string of recording marks formed on the track of the optical disk 1. A frame sync detector 5 detects a frame sync included in the track reproduction signal, and protects the cycle of the frame sync. The frame sync detection window width wT (w is a positive number) and the times n (n is a natural number) the frame sync lockout determination is made are set by a system controller 11. An ADIP sync detector 6 detects an ADIP sync, the phase of which is modulated to provide a wobble reproduction signal, and protects the cycle of the frame sync, and also detects a data bit. A data decoder 7 demodulates frame data based on the detected frame sync, and decodes and corrects an error correcting signal that is added to the demodulated data, facilitating the reproduction of information recorded on the optical disk 1. A data ID detector 8 detects a data ID that is included in the demodulated data and that is located at the head of a sector. An ADIP address detector 9 latches a 0 or 1 data bit, reproduced following the detection of the ADIP sync, and recovers an ADIP word. Further, the ADIP address detector 9 decodes and corrects an error correcting code (RS-ECC), and detects an ADIP address. A phase difference detector 10 measures a timing phase difference between frame sync detection timing, employed by the frame sync detector 5, and ADIP sync detection timing, employed by the ADIP sync detector 6, and obtains phase difference information yT (y is a positive number). The system controller 11, which provides overall control for the disk recording apparatus, specifically exchanges data with a host computer via an interface 12 or, based on address information obtained by the disk reproduction process, generates a control signal for a servo unit 16 to control the target track access. The interface 12 is used for the exchange of data by the host computer and the disk recording apparatus. Relative to information received from the host computer that is to be recorded to the optical disk 1, a data encoder 14 adds an error correcting signal and a data ID, or performs a frame process including data modulation process, and adds a frame sync. In accordance with a recording signal received from the data encoder 14, a laser driver 15 generates a recording pulse used for forming a recording mark on a track. The servo unit 16 rotates the disk motor 2 and controls the focusing and tracking processes performed by the optical head 3, and the radial movement, thereof, across the disk.

The writing operation performed by the disk recording apparatus in FIG. 1 will now be explained while referring to the flowchart in FIG. 3. When a writing instruction (the head address on a recording track and the number of recording blocks) is issued by the host computer via the interface 12, the system controller 11 issues an access control instruction to the servo unit 16 in order to move the optical head 3 to a target track location on the optical disk 1 and to control the access.

The servo unit 16 generates a focusing signal, a tracking signal and a rotation control signal for the optical head 3, and based on the ADIP address or the data ID acquired from a wobble reproduction signal or a track reproduction signal for the optical disk 1, the system controller 11 seeks and accesses the target recording track (steps 401, 402 and 403).

Whereupon the phase difference detector 10 detects the phase difference yT between the detection timing employed by the frame sync detector 5 and the detection timing employed by the ADIP sync detector 6 (step 404); and the system controller 11 compares the phase difference yT with the frame sync detection window width wT set for the frame sync detector 5 (e.g., the permissible cycle error value for detection protection relative to a frame sync signal), and determines whether during disk reproduction the frame sync detection can be performed continuously (step 405).

Specifically, when the relationship yT>wT is established, it is assumed that frame data that have been reproduced, during a period extending from when, at the reproduction time, the frame sync was not detected until the lockout (n frames) is detected and the pulling-in is initiated, have been transmitted as a burst error to the ECC block, and program control advances to step 406. When y≦w is established, however, it is assumed that the transmission of a burst error, accompanied by the non-detection of a frame sync, can be avoided. Then, at step 407, the linking location of the ECC block boundary is specified based on the wobble location, which is designated following the detection of the ADIP sync, and the ADIP address or the data ID, and data are rewritten for each ECC block.

When it is assumed at step 405 that a burst error has been transmitted to the ECC block, an ECC block to be rewritten is stored in a reserved area, allocated in advance in a disk recording area separate from the target rewriting track, or in an unused area on the optical disk 1, and the ECC block that originally was to be rewritten is determined to be defective. Further, the address information for the ECC block that is determined to be defective and the address information for the replacement ECC block, wherein the data are recorded, are added to a management table and are recorded on the optical disk 1. The replacement process at step 406 is performed by the system controller 11, or by the host computer via the interface 12.

Figure 4:
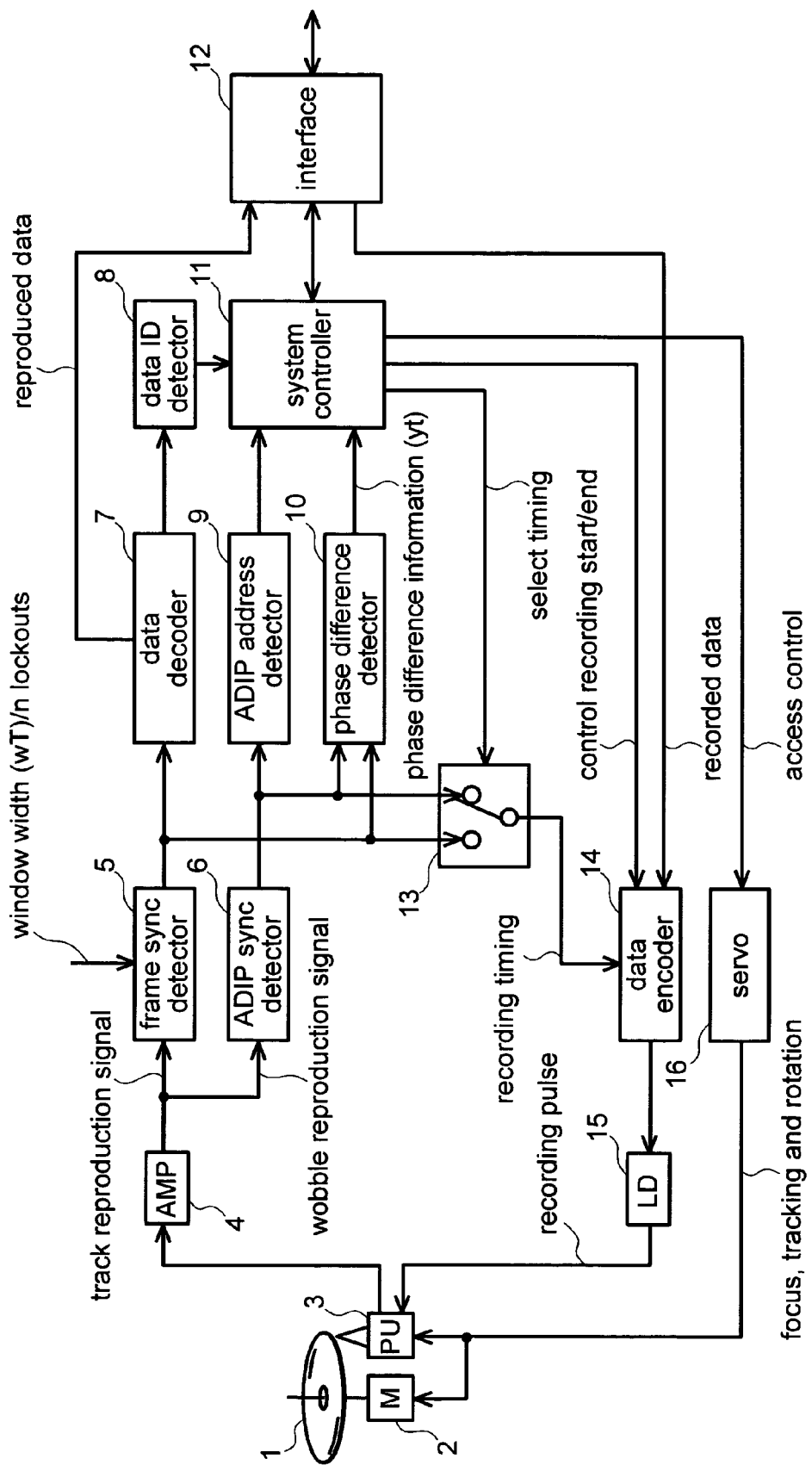
FIG. 4 is a block diagram showing a disk recording apparatus according to a second embodiment of the present invention.

FIG. 4 is a block diagram showing a disk recording apparatus according to a second embodiment of the present invention. In FIG. 4, a selector 13 selects a recording timing in accordance with a selection instruction transmitted by a system controller 11. The same reference numerals as used in FIG. 1 are employed to denote corresponding components, and for them, no further explanation will be given.

The recording operation performed by the disk recording apparatus in FIG. 4 will now be described while referring to the flowchart in FIG. 5. Since the processes at steps 601 to 604 are the same as those at steps 401 to 404 in FIG. 3, and the processes performed by the system controller 11 to control the disk recording apparatus are the same as those for the first embodiment, no further explanation for them will be given.

At step 604, a phase difference detector 10 detects a phase difference yT between the frame sync detection timing and the ADIP sync detection timing, and the system controller 11 compares the phase difference yT with the frame sync detection window width wT. Thus, the system controller 11 performs an inspection to ascertain whether the transmission of a burst error to the ECC block has occurred, and determines whether during the disk reproduction the frame sync detection can be performed continuously when the rewriting of the ECC block is performed in synchronization with the wobble location that is designated as a result of the ADIP sync detection (step 605).

When it is assumed at step 605 that the transmission of the burst error can be avoided, the selector 13 selects the ADIP sync detection timing as the recording timing (step 608). Then, in accordance with the selected timing, the data encoder 14 specifies the ECC boundary (linking location) corresponding to the wobble location on the optical disk 1, and performs frame recording for the track and the rewriting of each ECC block.

When it is assumed at step 605 that the burst error is to be transmitted to the ECC block, the selector 13 selects the frame sync detection timing as the recording timing (step 606). Then, in accordance with the selected timing, the data encoder 14 synchronizes the disk recording timing with the selected timing, designates the ECC boundary (linking location) corresponding to the frame position on the track, and performs frame recording for the track and the rewriting of each ECC block.

The branch decision (step 405) in the first embodiment or the branch decision (step 605) in the second embodiment are performed after the process at step 404 or 604 has been repeated several times, so that the reliability of the detection of the phase difference between the frame position and the wobble location on the track can be improved, and appropriate process branching is enabled. Therefore, for the first embodiment, the need for the replacement process is reduced, and the reduction of the data transfer rate in the reproduction process can be suppressed as much as possible. For the second embodiment, a recording timing appropriate for the rewriting of data can be selected.

At the branch decision at steps 405 and 605, the object to be compared with the phase difference yT is not limited to the frame sync detection window width wT, and may be any information indicating a permissible value relative to the fluctuation of the frame sync signal detection cycle during disk reproduction.

Further, at steps 405 and 605, when the lock out detection condition for the detection window, which is set for the frame sync detector 5, is established n times, the system controller 11 may calculate the number of frames that are transmitted as burst errors due to the non-detection of the frame sync signal and then perform the branching process.

Figure 2:
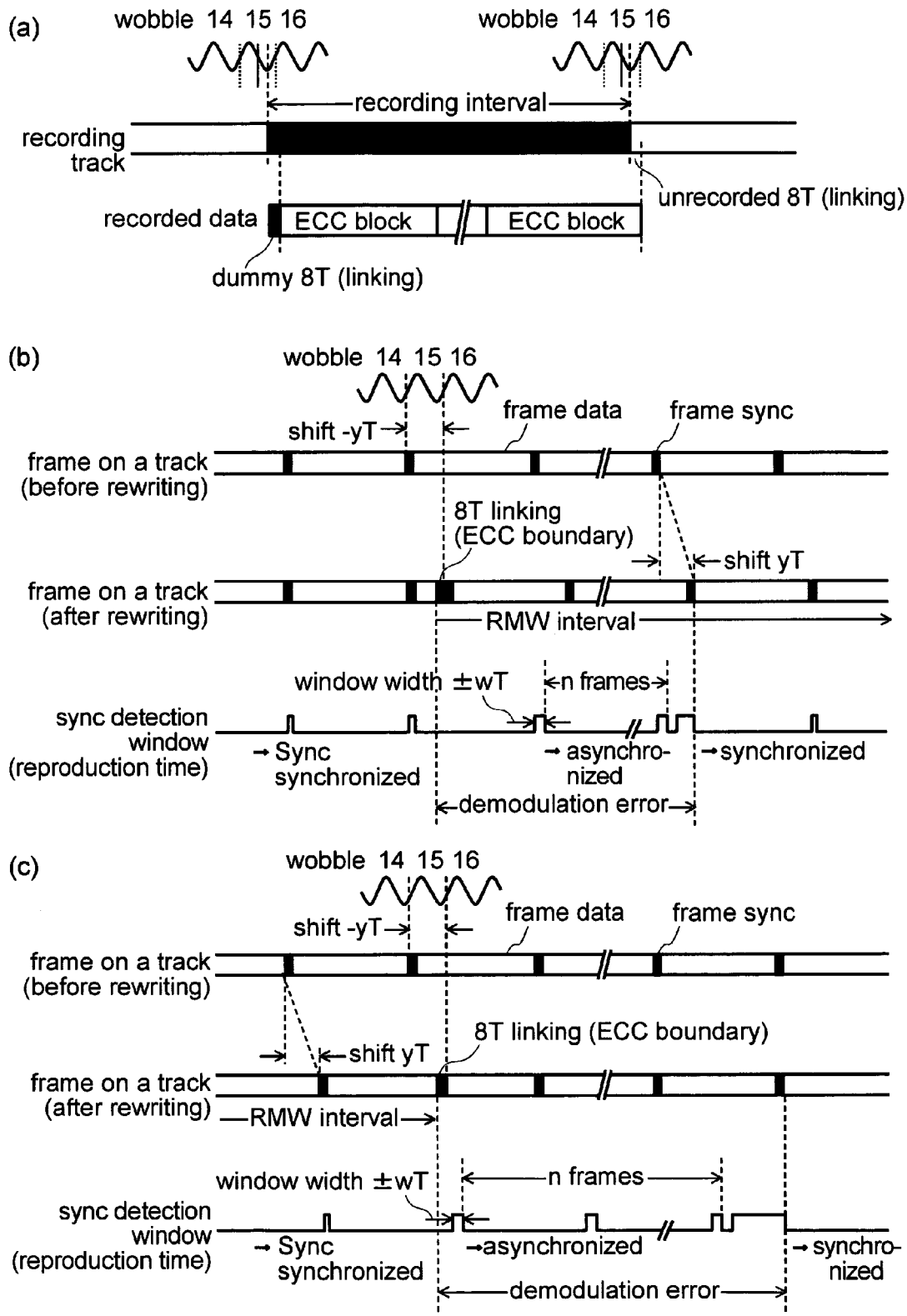
FIGS. 2A, 2B and 2C are diagrams for explaining problems that occur when rewriting is performed while frames are shifted.

Specifically, when the lock out condition is established n times, the number of error frames is about (n+1) in both examples in FIGS. 2B and 2C. When the burst error frame count (n+1) or the amount of data included in the error frames exceeds a determination value m (m is a natural number), the system controller 11 decides to branch to step 406 (606). When the error frame count (n+1) is equal to or smaller than m, the system controller 11 decides to branch to step 407 (608).

The value m is determined by the correcting capability provided for the ECC block that serves an error correcting unit for information recorded on the optical disk 1. Therefore, the processing can be appropriately branched to step 406 (606) or step 407 (608), while taking into account the error correction capability provided for the ECC block during reproduction. Thus, for the first embodiment, the reduction of the data transfer rate due to the replacement process can be suppressed as much as possible, while for the second embodiment, the appropriate recording timing can be selected for the data rewriting.

In this case, the number of times n, which is set for the frame sync detector 5, at which the lock out detection condition of the detection window is employed is used to determine the number of error frames. However, any other information may be employed that indicates the number of frames or the amount of data present during a period extending from the occurrence of the synchronization of a track reproduction signal to the start of the pulling-in process.

For the first and second embodiment, the frame sync detection timing and the ADIP sync detection timing, which are used for the detection of the phase difference or the generation of the recording timing, may be replaced with the detection timing used by the data ID detector 8 and the detection timing used by the ADIP address detector 9. Further, a data bit detection timing may be employed instead of the ADIP sync detection timing. The phase modulation is performed for the data bit more frequently than for the ADIP sync, and the detection probability is higher. Therefore, when the data bit, together with the ADIP sync, is employed, the detection of the phase difference can be repeated in a short period of time. For an optical disk having data bits such that data 0 and data 1 are identified by the difference in a wobble location to be modulated, the phase difference is detected while taking into account the difference in the wobble location. For an optical disk with the data bits either all 0 or all 1, such a consideration is not required.

As is described above, the detection timing required for the detection of the phase difference and for the generation of the recording timing need only be a combination of a timing synchronized with a track reproduction signal and a timing synchronized with a wobble reproduction signal.

Figure 3:
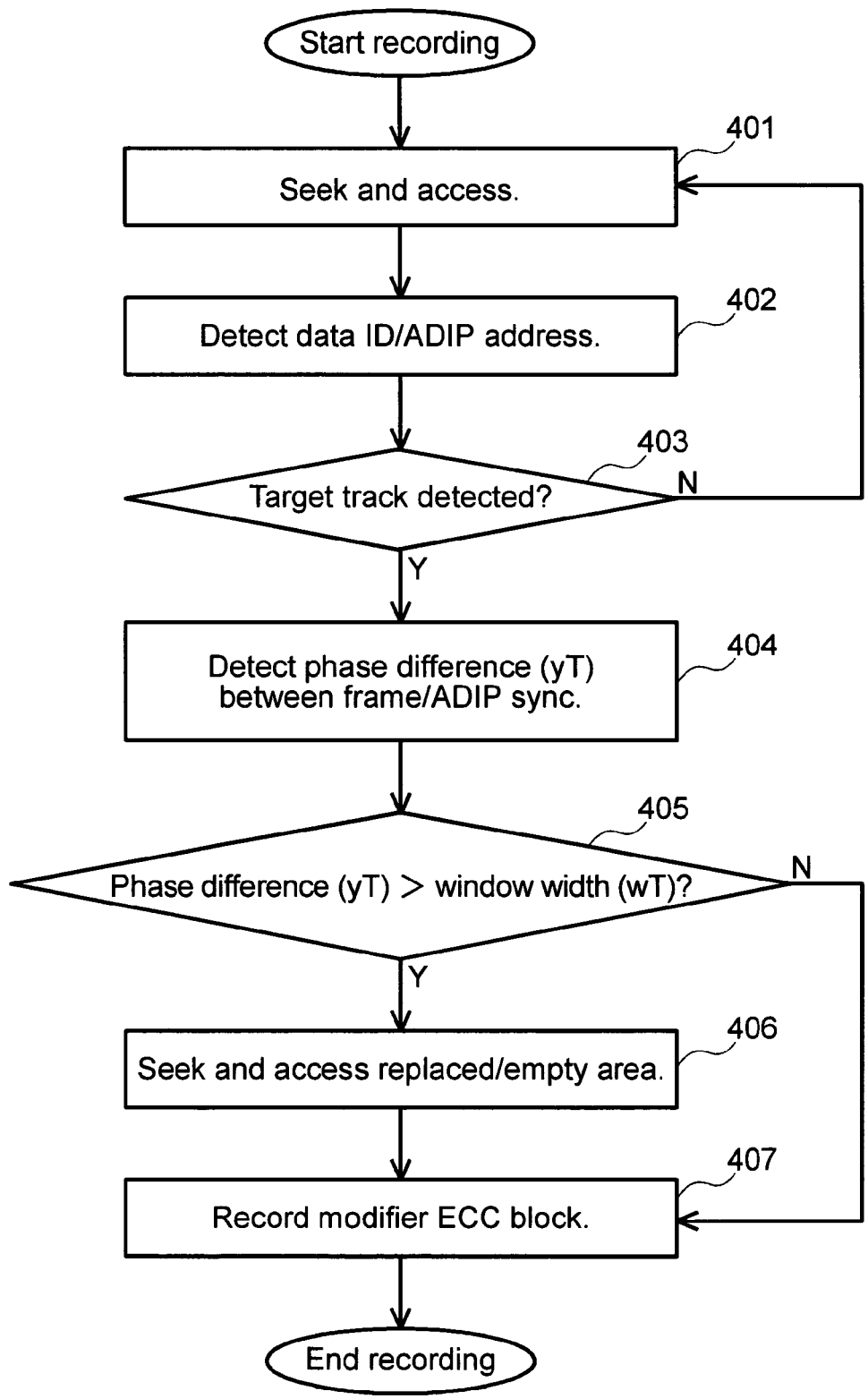
FIG. 3 is a flowchart showing a writing method employed by the disk recording apparatus in FIG. 1.
Figure 5:
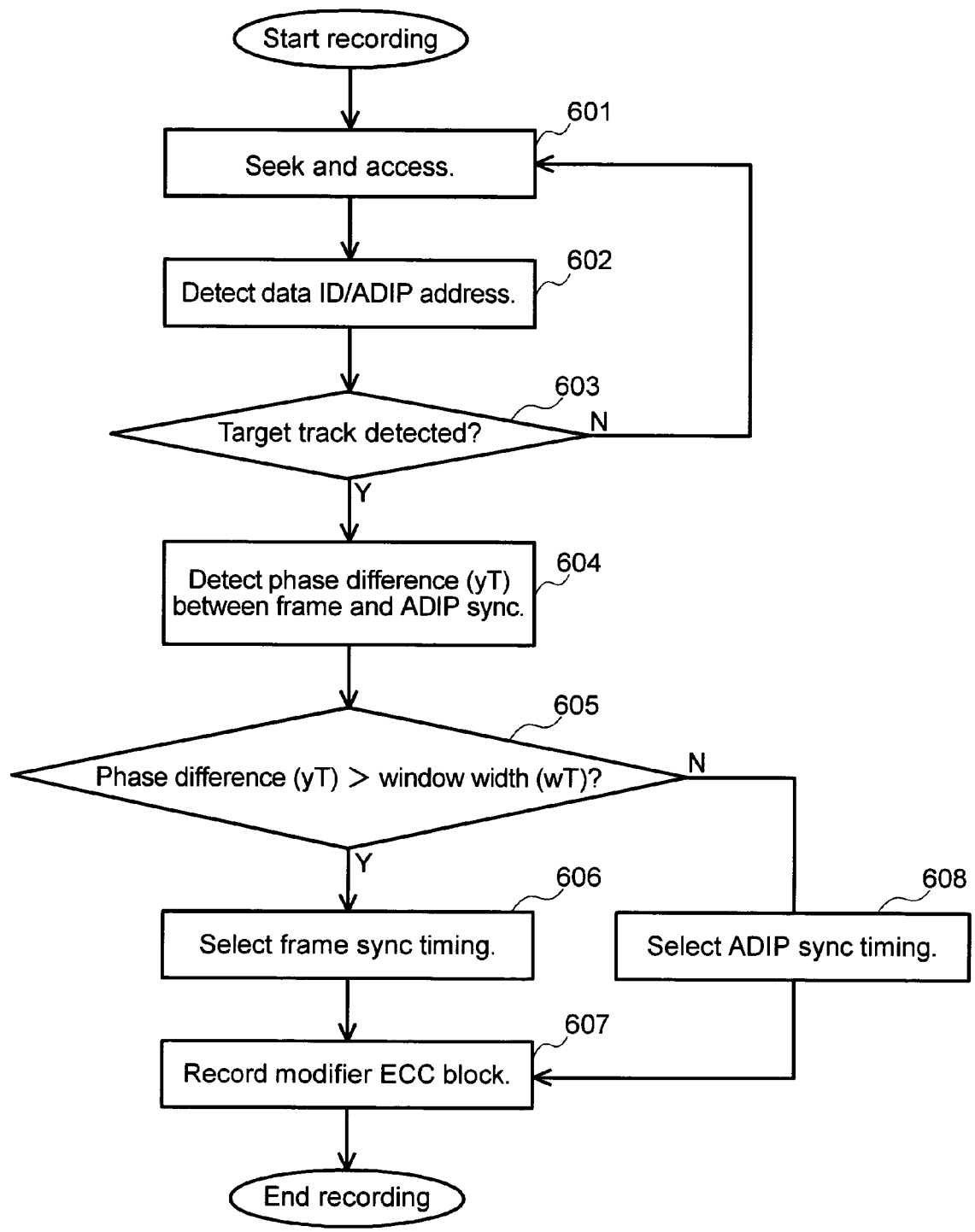
FIG. 5 is a flowchart showing a writing method employed by the disk recording apparatus in FIG. 4.

Further, when rewriting is to be performed for an optical disk having a land prepit (LPP) format, the writing method shown in FIG. 3 or 5 can be employed by simply replacing part of the components of the disk recording apparatus in FIG. 1 or 4, and the same effects can be obtained.

Specifically, the ADIP sync detector 6 and the ADIP address detector 9 need only be replaced with an LPP sync detector and an LPP address detector for respectively detecting a sync signal and address information included in an LPP signal. With this arrangement, the selector 13 can select either a frame sync detection timing or an LPP sync detection timing, and the same effects as in the first or the second embodiment can be obtained.

According to the present invention, the reliability of the reproduction of information recorded on a disk can be improved.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A disk recording apparatus for a rewritable optical disk, the disk recording apparatus comprising:
   a first timing detector having a first timing synchronized with a wobble reproduction signal of the rewritable optical disk;
   a second timing detector having a second timing synchronized with a track reproduction signal of the rewritable optical disk;
   a phase difference detector configured to detect a phase difference between the first timing and the second timing; and
   a controller configured to determine a recording area based on the detected phase difference,
   wherein the phase difference between the first timing and the second timing is yT, y is a positive number, and T is a channel bit which is a basic unit for a recording mark length on an optical disk;
   wherein, if |y|>|w| is established as a relationship between the detected phase difference yT and a preset permissible cycle error value wT of a sync signal detected in the track reproduction signal and w is a positive number, the controller is configured to control writing of data on a recording area using a preset reserved area or an empty area on the optical disk; and
   wherein, if |y|≦|w| is established, the controller is configured to control writing of data to a target track on the optical disk.

2. A disk recording apparatus for a rewritable optical disk, the disk recording apparatus comprising:
   a first timing detector having a first timing synchronized with a wobble reproduction signal of the rewritable optical disk;
   a second timing detector having a second timing synchronized with a track reproduction signal of the rewritable optical disk;
   a phase difference detector configured to detect a phase difference between the first timing and the second timing; and
   a controller configured to determine a recording area based on the detected phase difference,
   wherein the phase difference between the first timing and the second timing is yT, y is a positive number, and T is a channel bit which is a basic unit for a recording mark length on an optical disk;
   wherein the controller is configured to employ the detected phase difference to calculate an amount n of error data relative to the track reproduction signal, n being a natural number;
   wherein, if n>m is established as a relationship between the amount n of error data and a preset permissible amount m of error data, m being a natural number, the controller is configured to control writing of data on a recording area using a preset reserved area or an empty area on the optical disk; and
   wherein, if n≦m is established, the controller is configured to control writing of data to a target track on the optical disk.

3. A disk recording apparatus for a rewritable optical disk, the disk recording apparatus comprising:
- a first timing detector having a first timing synchronized with a wobble reproduction signal of the rewritable optical disk;
- a second timing detector having a second timing synchronized with a track reproduction signal of the rewritable optical disk;
- a phase difference detector configured to detect a phase difference between the first timing and the second timing; and
- a controller configured to determine a recording area based on the detected phase difference,
- wherein if the controller determines that the recording area for writing the data is a target track on the optical disk, the controller is configured to control a selector to select a recording timing based on the detected phase difference, and to record data on a recording track in accordance with the selected timing;
- wherein the phase difference between the first timing and the second timing is yT, y is a positive number, and T is a channel bit which is a basic unit for a recording mark length on an optical disk;
- wherein, if |y|>|w| is established as a relationship between the detected phase difference yT and a preset permissible cycle error value wT of a sync signal detected in the track reproduction signal and w is a positive number, the controller is configured to select the second timing; and
- wherein, if |y|≦|w| is established, the controller is configured to select the first timing.

4. A disk recording apparatus for a rewritable optical disk, the disk recording apparatus comprising:
- a first timing detector having a first timing synchronized with a wobble reproduction signal of the rewritable optical disk;
- a second timing detector having a second timing synchronized with a track reproduction signal of the rewritable optical disk;
- a phase difference detector configured to detect a phase difference between the first timing and the second timing; and
- a controller configured to determine a recording area based on the detected phase difference,
- wherein if the controller determines that the recording area for writing the data is a target track on the optical disk, the controller is configured to control a selector to select a recording timing based on the detected phase difference, and to record data on a recording track in accordance with the selected timing;
- wherein the phase difference between the first timing and the second timing is yT, y is a positive number, and T is a channel bit which is a basic unit for a recording mark length on an optical disk;
- wherein the controller is configured to employ the detected phase difference to calculate an amount n of error data relative to the track reproduction signal, n being a natural number;
- wherein, if n>m is established as a relationship between the amount n of error data and a preset permissible amount m of error data, m being a natural number, the controller is configured to select the second timing; and
- wherein, if n≦m is established, the controller is configured to select the first timing.

5. A disk recording apparatus for a rewritable optical disk, the disk recording apparatus comprising:
- a first timing detector having a first timing synchronized with a wobble reproduction signal of the rewritable optical disk;
- a second timing detector having a second timing synchronized with a track reproduction signal of the rewritable optical disk;
- a phase difference detector configured to detect a phase difference between the first timing and the second timing;
- a selector configured to select a timing between the first timing and the second timing; and
- a controller configured to control the selector to select the timing based on the detected phase difference, and to record data on a recording track in accordance with the selected timing,
- wherein the phase difference between the first timing and the second timing is yT, y is a positive number, and T is a channel bit which is a basic unit for a recording mark length on an optical disk;
- wherein, if |y|>|w| is established as a relationship between the detected phase difference yT and a preset permissible cycle error value wT of a sync signal detected in the track reproduction signal and w is a positive number, the controller is configured to select the second timing; and
- wherein, if |y|≦|w| is established, the controller is configured to select the first timing.

6. A disk recording apparatus for a rewritable optical disk, the disk recording apparatus comprising:
- a first timing detector having a first timing synchronized with a wobble reproduction signal of the rewritable optical disk;
- a second timing detector having a second timing synchronized with a track reproduction signal of the rewritable optical disk;
- a phase difference detector configured to detect a phase difference between the first timing and the second timing;
- a selector configured to select a timing between the first timing and the second timing; and
- a controller configured to control the selector to select the timing based on the detected phase difference, and to record data on a recording track in accordance with the selected timing,
- wherein the phase difference between the first timing and the second timing is yT, y is a positive number, and T is a channel bit which is a basic unit for a recording mark length on an optical disk;
- wherein the controller is configured to employ the detected phase difference to calculate an amount n of error data relative to the track reproduction signal, n being a natural number;
- wherein, if n>m is established as a relationship between the amount n of error data and a preset permissible amount m of error data, m being a natural number, the controller is configured to select the second timing; and
- wherein, if n≦m is established, the controller is configured to select the first timing.

7. A disk recording method for a rewritable optical disk, the method comprising:
- detecting a phase difference between a first timing synchronized with a wobble reproduction signal of the rewritable optical disk and a second timing synchronized with a track reproduction signal of the rewritable optical disk; and
- determining a recording area for target data to be written based on the detected phase difference, wherein the phase difference between the first timing and the second timing is yT, y is a positive number, and T is a channel bit which is a basic unit for a recording mark length on an optical disk;

wherein, if |y|>|w| is established as a relationship between the detected phase difference yT and a preset permissible cycle error value wT of a sync signal detected in the track reproduction signal and w is a positive number, the target data is written on a recording area using a preset reserved area or an empty area on the optical disk; and wherein, if |y|≦|w| is established, the target data is written to a target track on the optical disk.

8. A disk recording method for a rewritable optical disk, the method comprising:

detecting a phase difference between a first timing synchronized with a wobble reproduction signal of the rewritable optical disk and a second timing synchronized with a track reproduction signal of the rewritable optical disk; and determining a recording area for target data to be written based on the detected phase difference, wherein the phase difference between the first timing and the second timing is yT, y is a positive number, and T is a channel bit which is a basic unit for a recording mark length on an optical disk;

further comprising employing the detected phase difference to calculate an amount n of error data relative to the track reproduction signal, n being a natural number;

wherein, if n>m is established as a relationship between the amount n of error data and a preset permissible amount m of error data, m being a natural number, the target data is written on a recording area using a preset reserved area or an empty area on the optical disk; and wherein, if n≦m is established, the target data is written on a target track on the optical disk.

9. A disk recording method for a rewritable optical disk, the method comprising:

detecting a phase difference between a first timing synchronized with a wobble reproduction signal of the rewritable optical disk and a second timing synchronized with a track reproduction signal of the rewritable optical disk;

determining a recording area for target data to be written based on the detected phase difference; and if the recording area for the target data to be written is determined to be a target track on the optical disk, selecting a recording timing between the first timing and the second timing based on the detected phase difference;

wherein the phase difference between the first timing and the second timing is yT, y is a positive number, and T is a channel bit which is a basic unit for a recording mark length on an optical disk;

wherein, if |y|>|w| is established as a relationship between the detected phase difference yT and a preset permissible cycle error value wT of a sync signal detected in the track reproduction signal and w is a positive number, the second timing is selected as the recording timing; and wherein, if |y|≦|w| is established, the first timing is selected as the recording timing.

10. A disk recording method for a rewritable optical disk, the method comprising:

detecting a phase difference between a first timing synchronized with a wobble reproduction signal of the rewritable optical disk and a second timing synchronized with a track reproduction signal of the rewritable optical disk;

determining a recording area for target data to be written based on the detected phase difference; and if the recording area for the target data to be written is determined to be a target track on the optical disk, selecting a recording timing between the first timing and the second timing based on the detected phase difference;

wherein the phase difference between the first timing and the second timing is yT, y is a positive number, and T is a channel bit which is a basic unit for a recording mark length on an optical disk;

further comprising employing the detected phase difference to calculate an amount n of error data relative to the track reproduction signal, n being a natural number;

wherein, if n>m is established as a relationship between the amount n of error data and a preset permissible amount m of error data, m being a natural number, the second timing is selected as the recording timing; and wherein, if n≦m is established, the first timing is selected as the recording timing.

11. A disk recording method for a rewritable optical disk, the method comprising:

detecting a phase difference between a first timing synchronized with a wobble reproduction signal of the rewritable optical disk and a second timing synchronized with a track reproduction signal of the rewritable optical disk;

selecting a recording timing between the first timing and the second timing based on the detected phase difference; and recording data to the rewritable optical disk in accordance with the selected recording timing, wherein the phase difference between the first timing and the second timing is yT, y is a positive number, and T is a channel bit which is a basic unit for a recording mark length on an optical disk;

wherein, if |y|>|w| is established as a relationship between the detected phase difference yT and a preset permissible cycle error value wT of a sync signal detected in the track reproduction signal and w is a positive number, the second timing is selected as the recording timing; and wherein, if |y|≦|w| is established, the first timing is selected as the recording timing.

12. A disk recording method for a rewritable optical disk, the method comprising:

detecting a phase difference between a first timing synchronized with a wobble reproduction signal of the rewritable optical disk and a second timing synchronized with a track reproduction signal of the rewritable optical disk;

selecting a recording timing between the first timing and the second timing based on the detected phase difference; and recording data to the rewritable optical disk in accordance with the selected recording timing, wherein the phase difference between the first timing and the second timing is yT, y is a positive number, and T is a channel bit which is a basic unit for a recording mark length on an optical disk;

further comprising employing the detected phase difference to calculate an amount n of error data relative to the track reproduction signal, n being a natural number;

wherein, if $n>m$ is established as a relationship between the amount n of error data and a preset permissible amount m of error data, m being a natural number, the second timing is selected as the recording timing; and wherein, if $n \leqq m$ is established, the first timing is selected as the recording timing.

* * * * *